W. F. MOTTIER.
CLUTCH AND TRANSMISSION MECHANISM.
APPLICATION FILED MAY 17, 1921.
1,409,396.
Patented Mar. 14, 1922.
2 SHEETS—SHEET 1.
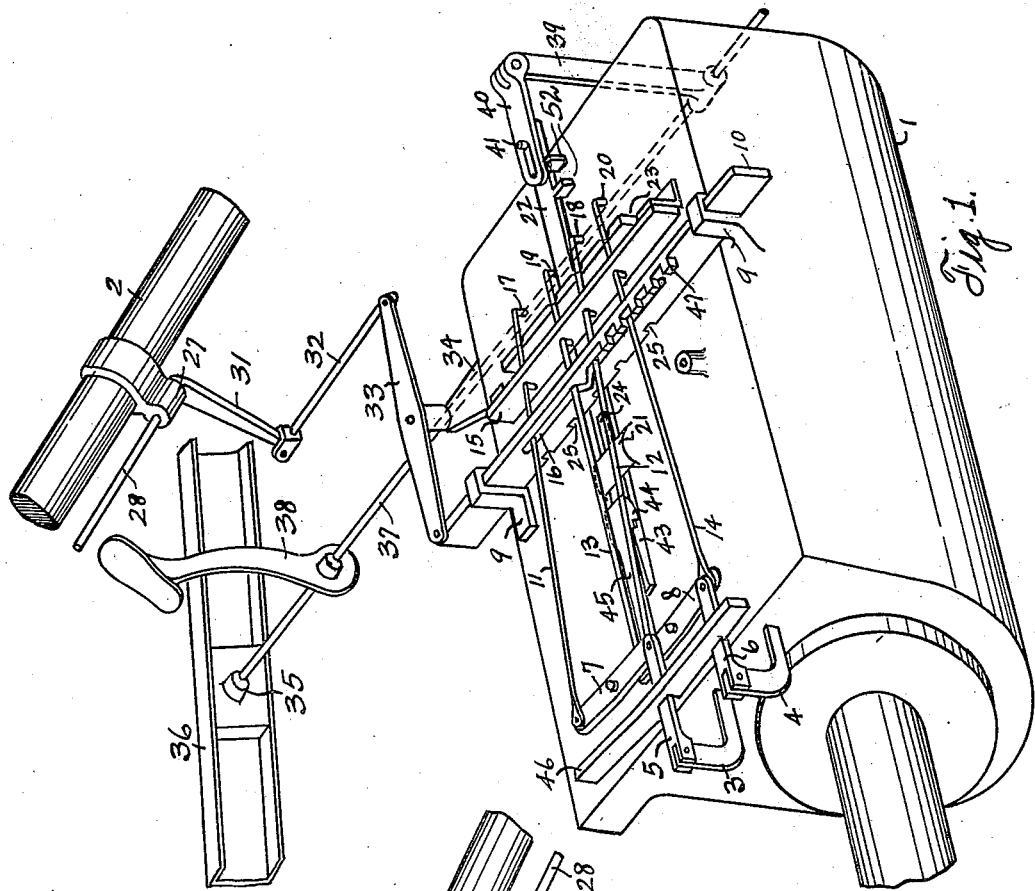
INVENTOR.
Walter F. Mottier
BY
Hardway Cathy
ATTORNEYS.

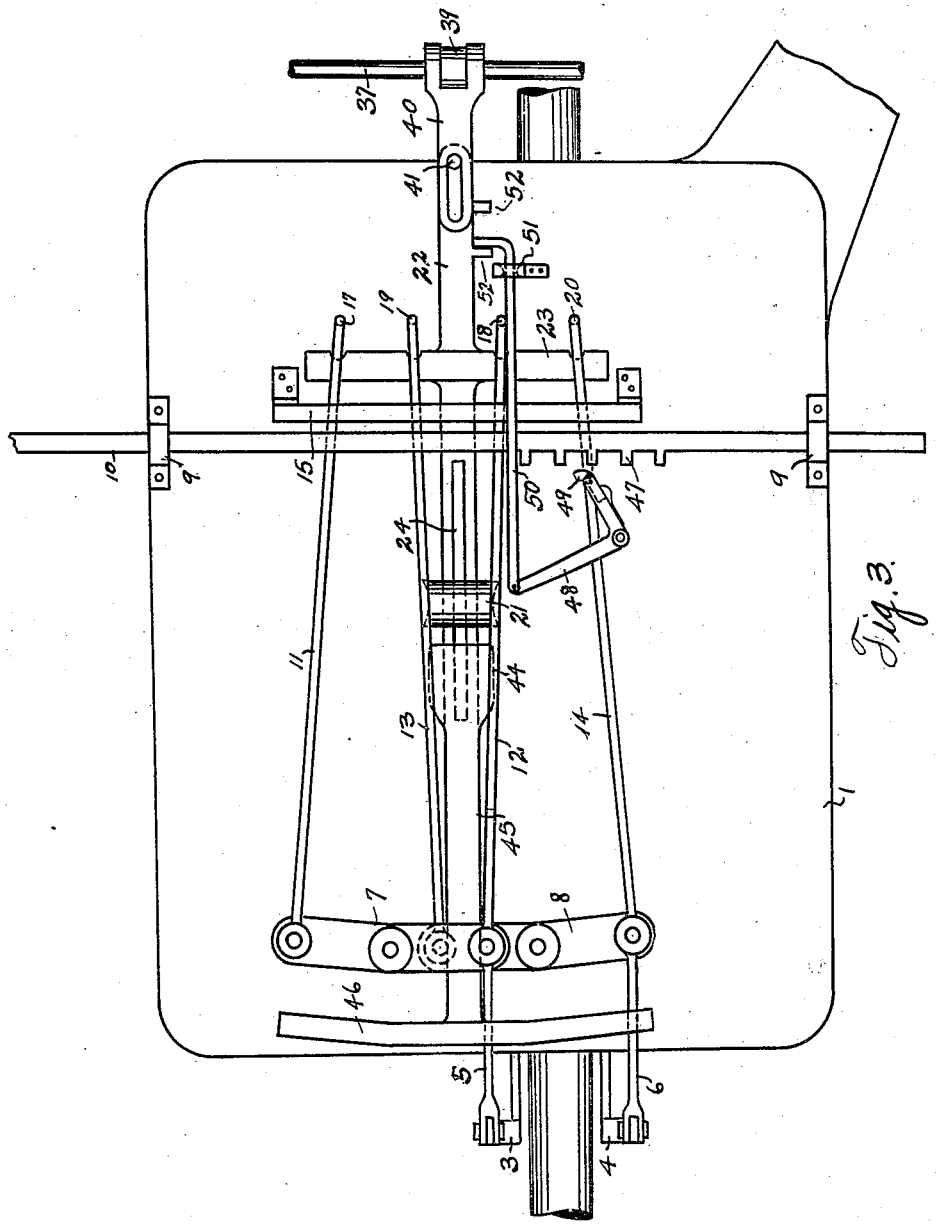

UNITED STATES PATENT OFFICE.

WALTER F. MOTTIER, OF EL CAMPO, TEXAS.

CLUTCH AND TRANSMISSION MECHANISM.

1,409,396. Specification of Letters Patent. Patented Mar. 14, 1922.

Application filed May 17, 1921. Serial No. 470,386.

*To all whom it may concern:*

Be it known that I, WALTER F. MOTTIER, a citizen of the United States, residing at El Campo, in the county of Wharton and State of Texas, have invented certain new and useful Improvements in a Clutch and Transmission Mechanism, of which the following is a specification.

This invention relates to new and useful improvements in a clutch and transmission mechanism.

One object of the invention is to provide a mechanism of the character described which is specially applicable to motor vehicles and has been designed for the operation of the clutch and transmission for effecting changes of speed; the particular object is to provide a mechanism through which the speed desired may be selected in advance and then obtained by an automatic shifting of the transmission gears when the clutch is disengaged through the operation of the clutch controlling lever.

Another object of the invention is to provide a mechanism of the character described which is so constructed that when the desired speed has been selected, the mechanism will be locked against accidental shifting so that when the clutch is manipulated the desired speed will always be obtained.

A further object is to provide means which prevents the shifting of the transmission mechanism when the speed selective device is not in position to obtain the desired speed.

A further feature resides in the provision of means which prevents the operation of said selective device when the clutch pedal is in operative position.

A still further feature resides in the provision of means which automatically throws the gear selecting mechanism out of operative position upon release of the clutch pedal.

With the above and other objects in view, the invention has particular relation to certain novel features of construction, arrangement of parts and use, an example of which is given in this specification and illustrated in the accompanying drawings, wherein:—

Figure 1 is a perspective view of the device as applied to the clutch and transmission of the motor vehicle, showing certain parts removed for the sake of clearness.

Figure 2 is a fragmentary perspective view of the steering column of said vehicle, showing the speed selective device, and Figure 3 is a plan view thereof.

Referring now more particularly to the drawings, the numeral 1 refers to the transmission case provided to enclose any conventional form of transmission mechanism, and the numeral 2 refers to the steering column. Mounted in the transmission case are the usual gear shifting rods 3 and 4, provision being thus made for shifting the transmission gears into reverse or low, intermediate and high speed ahead. The outer ends of the gear shifting rods 3 and 4 are upturned and the respective links 5 and 6 are pivoted at one end to said upturned ends, said links being pivoted at their other ends to corresponding ends of the respective neutralizing levers 7 and 8, said levers being pivoted at intermediate points to the top of said transmission case. Slidably mounted in the transversely aligned bearings 9, 9, carried by the transmission case, there is a transverse transfer bar 10. In the form shown there are four actuating rods 11, 12, 13 and 14, the rods 11 and 12 being pivoted at one end to the respective ends of the lever 7, and the rods 13 and 14 being pivoted at one end to the respective ends of the lever 8. These rods work through vertically elongated bearings in a stationary guide bar 15 which is fixed on the transmission case and also pass through a long slot 16, in the transfer bar 10. The free ends of the actuating rods carry the depending studs 17, 18, 19 and 20. Slidably mounted in a suitable bearing 21, carried by the transmission case, there is an actuating bar 22. This bar carries the cross arm 23, arranged behind the studs of the actuating rods and provided to engage with said studs for the purpose hereinafter specified. The upper side of the bar 22 is formed with an elongated rib 24 which works through one of the notches 25 formed in the lower edge of the transfer bar 10 when the actuating bar is manipulated and serves to lock said transfer bar against movement during the operation of shifting the gears. Secured at a convenient place, preferably to the upper end of the steering column, there is a segmental rack member 26, and rotatably mounted in suitable bearings 27, 27, carried by said column, there is a manual rod 28 whose upper end is provided with a manual lever 29 which is fixed thereto and which is formed to engage in spaced notches 30 of the rack member. The lower end of this rod 28 is formed with a laterally extending arm 31, to the free end of which the link 32 is pivoted at one end. The other end of this link is connected to one end of the lever 33, said lever being pivoted at an intermediate point to the laterally extending arm 34 of the transmission case, and the other end of this lever 33 is connected to and actuates the transfer bar 10. Rotatably mounted in suitable bearings, as 35, carried by the side members 36 of the vehicle frame, there is a transverse shaft 37, to which a foot pedal 38 is fixed. This shaft has the upstanding arm 39 fixed thereto, whose upper end has a sliding connection with the front end of the actuating bar 22. This sliding connection is effected by means of a slotted lug 40 which is hinged to the upper end of the arm 39, and a pin 41 which is carried by the front end of the bar 22 and works through said slot. The shaft 37 is connected to the clutch of the vehicle and through it said clutch may be released.

As shown in Figures 1, 2 and 3, the device is in neutral position. If it be desired to now shift the transmission to low speed ahead, and assuming that a rearward movement of the gear shifting rod 3 will accomplish this result, the manual lever 29 may be moved two notches to the right which will operate through the mechanism described to shift the transfer bar 10 to the left. It is here to be noted that the slot 16 is formed with a cam-shaped notch 42, into which the actuating rod 11 drops when the transfer bar is moved, as above indicated, and the stud 20 will drop down in front, and within the range of the cross arm 23. The device is thus set in position to shift the transmission mechanism to the selected speed. The pedal 38 is now depressed with the result that the clutch actuating shaft 37 will first disengage the clutch, while the slot of the lug 40 is moving on the pin 41 and further movement of said pedal 38 will operate to continue said rotation of the shaft 37, exerting a forward pull through the arm 39 upon the actuating bar 22 and causing the cross arm 23 to engage with the stud 20 and carry the same forwardly, thus operating through the actuating rod 11, the lever 7 and the link 5 to carry the gear shifting rod 3 rearwardly and shift the transmission gears to low speed ahead. It is to be here noted that the slip joint connecting the arm 39 and the bar 22 is provided so that the initial movement of the pedal 38 will effect the declutching of the motor but will not operate the bar 22 until after the clutch is engaged. The pedal 38 is now released and the clutch spring will operate to restore the actuating bar 22 to its original position.

The lever 7 and the rod 11, however, remain in position and the rib 24 is located in the corresponding notch 25, thus locking the transfer bar 10 against accidental or intentional shifting. When it is desired to again change speed, the manual lever 29 is shifted according to the speed selected, thus actuating the bar 10 to locate the required actuating rod in the cam notch 42 and carry the corresponding stud into the range of the cross arm 23 and the pedal 38 is again depressed, again moving the actuating bar 22 forwardly.

The rear end of the actuating bar 22 is formed with an engaging shoulder 43 in its upper side, arranged to engage with a corresponding shoulder 44 carried by the forward end of the neutralizing bar 45. The rear end of this bar carries the cross head 46 which rides on the links 5 and 6 and is in alignment with the neutralizing levers 7 and 8. When the actuating bar 22 moves forwardly, the cross head 46 engages against the neutralizing levers and brings them into alignment, thus operating to shift the transmission mechanism to neutral position and thereupon the forward end of the neutralizing bar rides up onto the bearing 21 and is disengaged from the actuating bar 22 which moves on forwardly, as above explained, and effects the required change of gear ratio. As one of the actuating rods is moved forwardly the opposite end of the neutralizing bar, to which it is attached, moves rearwardly and carries the cross head back to its original position.

It is obvious that other changes of speed may be obtained by a suitable manipulation of the manual lever 29 in a similar manner to that above described.

When it is desired to shift the transmission mechanism to neutral position only this is accomplished by setting the manual lever 29 in the central notch 30, as shown in Figure 2, and when in this position the transfer bar 10 will be in neutral position, that is, the actuating rods 11 to 14 will lie in the slot 16 out of the cam notch 42 and the studs 17 to 20 will be held up out of range of the cross arm 23. When the pedal 38 is then depressed, the actuating bar 22 will move forwardly carrying with it the neutralizing bar 45 until the cross head 46 contacts with and aligns the levers 7 and 8, thus bringing the transmission mechanism to neutral position, and as the bar 22 continues to move forwardly the neutralizing bar will be disconnected therefrom, as explained, and the cross arm will pass under the studs of the actuating rods without further influencing the transmission gears.

The rear side of the transfer bar 10 has the spaced lugs 47 and pivoted on the case 1 in the rear of said bar there is a bell crank 48. The free end of one arm of the bell crank carries a yieldable dog 49 and one end of a rod 50 is pivoted to the free end of the other arm. This rod works through a bearing 51 carried by the transmission case and its other end is overturned and works between the lugs 52, 52 projecting out laterally from the bar 22. The lugs 52 are so spaced that upon forward movement of the bar 22 the rear lug 52 will not contact with the overturned end of the rod 50 until the clutch is released and the rib 24 has engaged in the opposing notch 25 to lock the transfer bar, but thereafter, upon further movement of said bar 22 said rear lug will contact with said overturned end of the rod and actuate the bell crank to carry the dog 49 behind the adjacent lug 47, the dog 49 yielding to permit this. When the bar 22 has moved back far enough to release the rib 24 from the notch 25 the forward lug 52 will contact with the overturned end of the rod 50 and actuate the bell crank to carry the dog 49 into contact with the opposing lug 47 and throw the transfer bar over a sufficient distance to bring the notches 25 out of alignment with the rib 24. The transmission mechanism cannot then be operated until the speed selective device is again set, by reason of the fact that until this is done the rib 24 will lock against the transfer bar 10; and this result is accomplished automatically upon the release of the pedal and its return to non-operating position.

When the clutch has been released and the transmission actuated as explained the bar 10 will be locked against shifting by the engagement of the rib 24 in the notch 25 and the speed selective device cannot be again set, or the controlling mechanism of the transmission changed until the pedal is released and returns to non-operating position.

What I claim is:—

1. In a motor vehicle, the combination with a transmission mechanism, through which power may be transmitted from the motor at variable rates of speed, of a speed selective device adapted, when actuated, to effect the changes in the gear ratio, said device including gear shifting members connected to the transmission gears, a transfer mechanism and a manually controlled mechanism, through which said transfer mechanism may be shifted to adjust either of said members to a selected position, a clutch actuating means, an actuating device connected to and actuated by said means, through which the selected member is actuated to shift the corresponding transmission gear, interlocking means carried by said transfer mechanism and said actuating device, whereby the former is locked against movement during the operation of the latter.

2. In a motor vehicle, the combination with a transmission mechanism, through which power may be transmitted from the motor at variable rates of speed, of a speed selective device adapted, when actuated, to effect the changes in the gear ratio, said device including gear shifting members connected to the transmission gears, a transfer mechanism and a manually controlled mechanism through which said transfer mechanism may be shifted to adjust either of said members to a selected position, a clutch actuating means, an actuating device connected to and actuated by said means, through which the selected member is actuated to shift the corresponding transmission gear, an interlocking means carried by said transfer mechanism and said actuating device, whereby the former is locked against movement during the operation of the latter, and means actuated by the actuating device and operating to restore the transmission mechanism to neutral position prior to its actuation by said selective device.

3. In a motor vehicle, the combination with a transmission mechanism, through which power may be transmitted from the motor at variable rates of speed, of a speed selective device adapted, when actuated, to effect the changes in the gear ratio, said device including gear shifting members connected to the transmission gears, a transfer mechanism and a manually controlled mechanism, through which said transfer mechanism may be shifted to adjust either of said members to a selected position, a clutch actuating means, an actuating device connected to and actuated by said means, through which the selected member is actuated to shift the corresponding transmission gear, interlocking means carried by said transfer mechanism and said actuating device, whereby the former is locked against movement during the operation of the latter, and means preventing the second operation of said actuating device until said manually controlled mechanism has been again operated.

4. In a motor vehicle, the combination with a transmission mechanism, through which power may be transmitted from the motor at variable rates of speed, of a speed selective device adapted, when actuated, to effect the changes in the gear ratio, said device including gear shifting members connected to the transmission gears, a transfer mechanism and a manually controlled mechanism, through which said transfer mechanism may be shifted to adjust either of said members to a selected position, a clutch actuating means, an actuating device connected to and actuated by said means, through which the selected member is actuated to shift the corresponding transmission gear, and means operating automatically to prevent a subsequent operation of the actuating device until said manually controlled mechanism has been again operated.

5. In a motor vehicle, the combination with a transmission mechanism, through which power may be transmitted from the motor at variable rates of speed, of a speed selective device adapted, when actuated, to effect the changes in the gear ratio, said device including gear shifting members connected to the transmission gears, a transfer mechanism and a manually controlled mechanism, through which said transfer mechanism may be shifted to adjust either of said members to a selected position, a clutch actuating means, an actuating device connected to and actuated by said means, through which the selected member is actuated to shift the corresponding transmission gear, and means automatically shifting the transfer mechanism into position to prevent a second operation of said actuating device until said transfer mechanism is again manually shifted.

In testimony whereof I have signed my name to this specification in the presence of two subscribing witnesses.

WALTER F. MOTTIER.

Witnesses:
R. M. SMITH,
WM. A. CATHEY.